United States Patent [19]

Hoffmann

[11] 4,173,010

[45] Oct. 30, 1979

[54] TRAFFIC SIGN AND IMPROVED SYSTEM FOR RECORDING VEHICLE SPEED

[76] Inventor: Anton R. Hoffmann, P.O. Box 853, Lake Forest, Ill. 60045

[21] Appl. No.: 573,779

[22] Filed: May 1, 1975

[51] Int. Cl.$^2$ ............ G08G 1/10; G08G 1/01; G01D 9/42
[52] U.S. Cl. ............ 340/31 C; 235/92 TC; 340/38 R; 346/33 D; 346/107 VP
[58] Field of Search ........ 340/38 P, 38 R, 31 C, 340/104; 346/107 VP, 33 D; 352/39, 93, 94; 354/105, 109; 235/92 TC

[56] References Cited

U.S. PATENT DOCUMENTS

| | | | |
|---|---|---|---|
| 2,250,442 | 7/1941 | Abell | 346/107 VP |
| 2,769,165 | 10/1956 | Bower | 340/31 C |
| 2,813,468 | 11/1957 | Jones | 352/39 |
| 3,165,373 | 1/1965 | Scott | 346/107 VP |
| 3,181,150 | 4/1965 | Ruppersberg et al. | 340/31 C |
| 3,544,958 | 12/1970 | Carey et al. | 340/38 P |
| 3,788,201 | 1/1974 | Abell | 346/107 VP |
| 3,827,070 | 7/1974 | Hoerenz | 354/105 |
| 3,840,848 | 10/1974 | Marshall | 340/38 P |

OTHER PUBLICATIONS

Lamm, *Popular Mechanics*, Dec. 1969, pp. 73–76 and 194.

Primary Examiner—John W. Caldwell, Sr.
Assistant Examiner—James J. Groody
Attorney, Agent, or Firm—Trexler, Wolters, Bushnell & Fosse, Ltd.

[57] ABSTRACT

Sensors are positioned adjacent a roadway. Such sensors conveniently comprise pressure switches connected to two speed hoses to be run over as in a traffic counter. Alternately, photo-optical, acoustical, or magnetic field sensors can be used. The sensors are spaced a predetermined distance apart in the direction of travel, and provide information to a logic system to measure the speed of vehicles traveling along the roadway. The logic system is connected to a simple readout sign displayed for observation by drivers of vehicles along such roadway, which sign indicates whether a vehicle is traveling at a proper rate, or too fast or too slow, or too close to a preceding vehicle. A modified motion picture camera is provided adjacent the roadway to film a vehicle that is moving too rapidly, and a modified film editing device is provided for counting the frames exposed, and thereby to determine the speed of such vehicle. This latter device preferably reads out direct in miles per hour.

2 Claims, 3 Drawing Figures

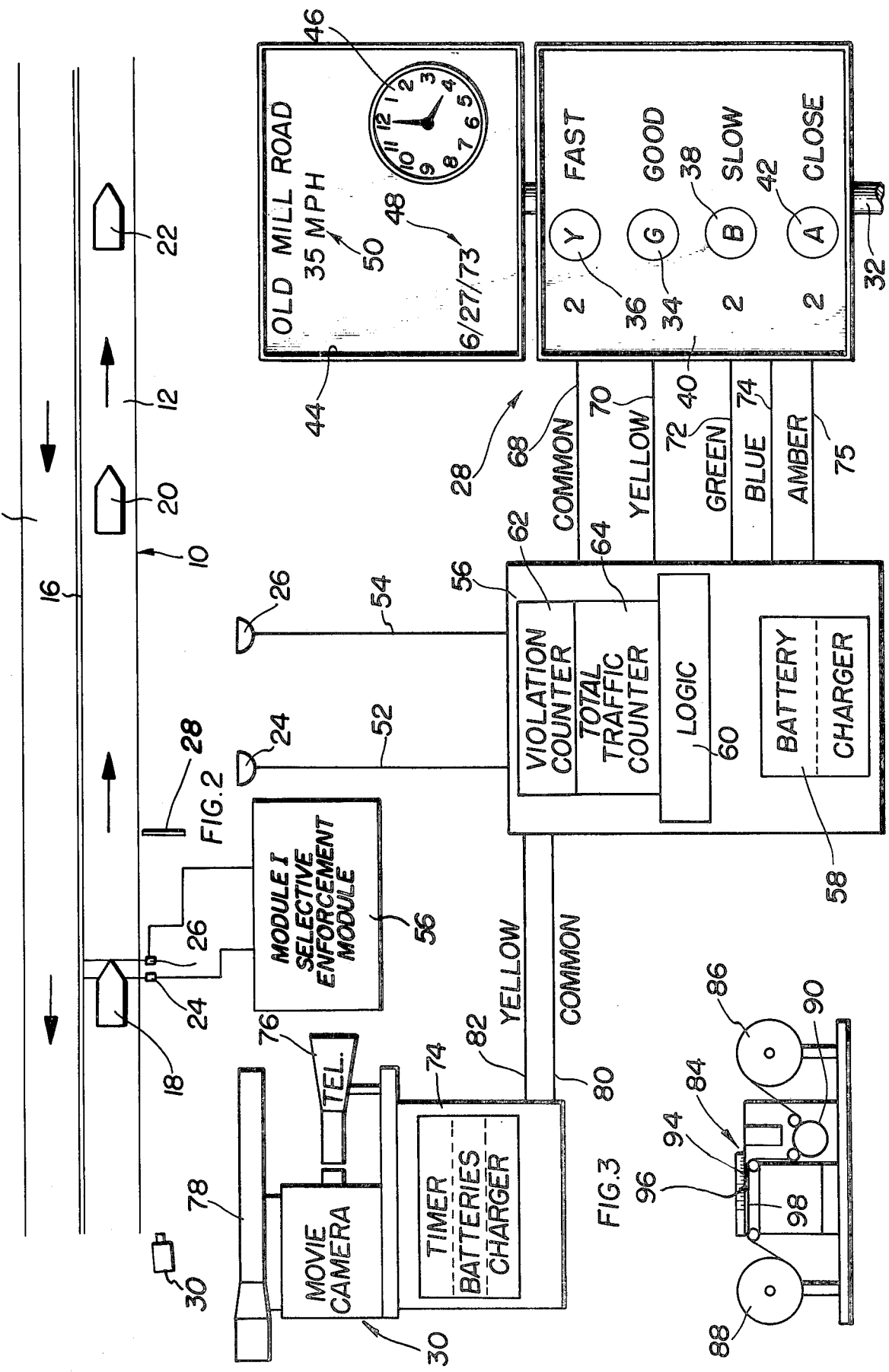

TRAFFIC SIGN AND IMPROVED SYSTEM FOR RECORDING VEHICLE SPEED

BACKGROUND OF THE INVENTION

The basic purpose for traffic speed enforcement is to promote the orderly movement of traffic at an expeditious, and yet safe rate of speed. Commonly available commercial systems, such as radar and vascar provide information to police officers as to speed of vehicle operation, and are useful in making and supporting arrests of drivers of vehicles that are traveling too fast.

The mere presence of a police car equipped with radar or vascar tends to slow traffic, and often slows it to an inefficient velocity. Arrests are almost always resented, and there is some question whether such resentment enhances traffic speed enforcement, or simply causes the driver to be determined not to get caught again. In addition, such systems are expensive to purchase and to operate, and must be monitored constantly to be effective.

SUMMARY AND OBJECTS OF THE INVENTION

In accordance with the present invention sensors are disposed adjacent, across, or across one lane of a roadway, and can be of any known or suitable type. Information from these sensors is fed to logic circuits in a selective enforcement module which in turn provide information to a speed conditioning module comprising a sign and counter adjacent the roadway position for reading by the drivers of automobiles and other vehicles passing these sensors. The sign is provided with three alternative lights to indicate whether the vehicle is proceeding at a proper speed, or too fast or too slow. An additional light also indicates if one vehicle is following another too closely. Since this portion of the invention is not intended for arrest, but for the monitoring of traffic speed, there is no need for it to be constantly manned. In actual tests it has been found that drivers react rather rapidly to the sign, and slow down or speed up, respectively, when the sign indicates if he was driving too fast or too slow. This causes traffic to move at an optimum rate as determined by the established speed limit.

The Selective Enforcement Module has two counters; one counter for traffic that totals the number of vehicles that exceed any predetermined speed limit and one counter that totals the total traffic. The circuitry is such that it ignores traffic in the opposite direction and only recognizes traffic in the desired direction. It preferably also contains counters for too slow and too close.

In addition, an enforcement module comprising a motion picture camera is set up to film passage of an automobile that is moving too fast, thereby providing a record of the license number of the vehicle, as well as the date and time displayed on the sign along with the previously indicated indicia. The speed of operation of the motion picture camera is known, and it is readily calculated from the number of frames exposed how fast a given vehicle is traveling. In accordance with one feature of the invention an optical-mechanical readout device is provided which automatically reads out the speed in miles per hour in accordance with the number of frames of film exposed.

Accordingly, it is an object of the present invention to provide a superior traffic speed monitor system of low cost which tends to produce movement of traffic at substantially a maximum legal speed.

Specifically, it is an object of the present invention to provide such a system in which information is provided to drivers of passing vehicles whether they are moving too fast or too slow, or driving at proper speed thereby tending to produce automatic speed regulation. Psychologically speaking, both negative and positive reinforcement are applied to induce the motorist to drive at a proper speed. Tests have already shown that they will strive to get the green or good light.

The foregoing and other objects will become apparent from the following description to be taken in connection with the accompanying drawings.

DRAWING DESCRIPTION

FIG. 1 is a somewhat schematic view of the physical installation and relation of parts of the present invention;

FIG. 2 is a block diagram illustrating the various components of the present invention; and FIG. 3 is a film editor providing direct reading of speed in miles per hour in accordance with the number of frames of film required for a vehicle to pass through the field of view.

DESCRIPTION OF THE PREFERRED EMBODIMENT OF THE INVENTION

Turning now in greater detail to the drawings, and first to FIG. 1, there will be seen a representation of a road or highway 10 having a lane 12 to be considered a "forward" lane and a lane 14 considered a "reverse" lane. The center line 16 divides the lanes. Automobiles or other vehicles are represented schematically at 18, 20 and 22 traveling in the forward direction.

Sensors 24 and 26 are provided in spaced relation at the roadside along the "forward" direction. As a specific example, sensor 24 has previously sensed the front end of the vehicle 18 and sensor 26 is, in the position shown, sensing the front end of the vehicle 18, whereby the time for the vehicle to travel from sensor 24 to sensor 26 is easily measured. Various types of satisfactory sensors are known in the art, and could comprise such simple devices as pneumatic hoses across the "forward" lane 12, optical sensors, in which case a light source might be placed on the opposite side of the highway to provide a beam to the respective sensor which would be cut by the passage of a vehicle, or magnetic or capacitive proximity devices. An acoustical sensor has also been used satisfactorily. Circuitry is set up so that only the front wheels of a vehicle activate the equipment. Rear wheels are ignored. The circuitry also ignores traffic moving in the opposite direction. This makes it possible for hoses to be run across both lanes when desired. Equipment used at the present time has pneumatic hoses set one foot apart for each five miles per hour of vehicle speed. I.e., if the speed limit is 35 mph, hoses are spaced $35 \div 5 = 7$ feet apart.

The sign 28, of which more will be said later, is disposed adjacent the highway and is positioned to be read by the driver of a vehicle in the position roughly of vehicle 18. In addition, motion picture camera 30 is provided adjacent the side of the road and behind sensors 24 and 26. If a vehicle is traveling too fast, the motion picture camera is actuated and remains running for a predetermined time. From the time the left rear corner of the car moves into the field of view and until it disappears from the field of view will represent a certain number of frames of movie film, and with the speed of the camera, and the distance which it covers also being known, the speed of the vehicle is readily known from the number of frames of motion picture film taken. The camera is positioned so that the sign 28 is within the field of view of the camera and far enough away so as to be in focus.

Attention now should be directed to FIG. 2 wherein the sign 28 comprising a speed conditioning module is shown in greater detail. The sign is shown as mounted on a post 32, and has a lower display panel having a green light 34 which lights up opposite the word "GOOD" when a vehicle is driving within a given speed range, for example from the posted speed limit to some predetermined speed below the speed limit, perhaps 10 miles per hour below the speed limit, although the precise lower limit must be determined by traffic and road conditions.

Above the "GOOD" display light 34 there is a "2 FAST" display light 36 which is yellow in color so as to warn the driver that he is driving too fast. It has been found that seeing this yellow light lit up causes the driver instinctively to slow down to the proper speed.

Below the "GOOD" display light 34 is a "2 SLOW" display light 38 which is blue, and which lights if the vehicle is traveling below the minimum speed determined to be safe.

Finally, at the bottom of the lower sign panel 40 there is a "2 CLOSE" amber light 42 which lights up if the test vehicle 18 is too close behind the immediately preceding vehicle 20. Regardless of speed, an interval of less than three seconds will light the amber "2 CLOSE" light.

An upper sign panel 44 also is conveniently mounted on the same post, and is provided with a clock 46 which indicates the time. This sign may be located underneath. In some cases it might even be located across the street. The panel 44 preferably is of steel, and magnetic letters 48 are applied manually each day to indicate the date. As will be appreciated, this could be done under the control of the clock 46, but at greater equipment cost. At the top of the panel 44 is a display 50 indicating the name of the road and also the posted speed limit. This can be permanently affixed to the panel, or it also can be made up of magnetic letters magnetically held on the steel panel. The sign could be eliminated and the same information could be superimposed on the film by known optical means.

The sensors 24 and 26 may be respectively connected by wires 52 and 54 to a module 56 referred to as Module I or Selective Enforcement Module. Preferably these sensors are an integral part of Module I. This module alone can be very useful in making selective enforcement traffic surveys and is the primary unit. Module I 56 includes a battery and charger unit 58 for providing electrical power without the necessity of plugging into a power line. Logic circuits 60 are provided within the module 56 and are connected to the wires 52 and 54 by means not shown for purposes of clarity of the drawing. The logic circuits are connected to internal portions of the module 56, including a violation counter 62, a traffic counter 64, and counter for too slow and too close. Although it is believed that suitable logic circuits would be obvious to one skilled in the art, references is made to Carey et al U.S. Pat. No. 3,544,958 which discloses logic circuits for effecting a similar purpose.

Externally, the module 56 is connected to the speed conditioning module comprising sign 28 by means of a common wire 68, a yellow wire 70 to the light 36, a green wire 72, to the green light 34, and a blue wire 74 to the blue light 38, and an amber wire 75 to the amber light 42. All of these wires preferably are provided as a single cable.

Also in FIG. 2 there will be seen a module 74 containing a timer, batteries, and a charger. The batteries and charger are utilized at a central station for storing electric power so that a movie camera can be operated without the necessity of plugging it into a line on location. The timer causes the movie camera to operate for a predetermined time when operation is started. The timer may be of any suitable known type including a motor driven cam and switch, or electronic of sophisticated type or of simple type such as a resistance capacitance timing circuit and a relay, the relay being either electronic or electromechanical. The movie camera, which with associated parts comprises an enforcement module, is provided with a telephoto lens indicated at 76, and also is provided with a sight 78 which is shown as positioned on top of the camera, although it could equally well be integrated in the camera. The telephoto lens is shown as a separate lens, and it also will be understood that this could be a part of the camera rather than an attachment. The module 74 is connected to the module 56 by a common wire 80 and by an additional wire 82 shown as yellow.

When the sensors 24 and 26 combined with the logic 60 determine that a vehicle is traveling too fast, a signal is transmitted over the lines 80, 82 (preferably comprising a single cable) to start the movie camera in operation. The timer then continues the movie camera in operation for a predetermined time which is more than long enough for the vehicle to pass completely through the field of view of the movie camera, usually about three seconds. The timing circuitry in the camera module is such that it is accumulative. That is if a second speeding car follows too close to a first speeding car, camera will continue running for another three seconds and so on. The camera starts in operation before the vehicle comes into view, and while the vehicle is in view the type of vehicle, the license number thereof, and the date and time of day on the sign panel 44 are recorded. In actual practice the camera is set up so as to record approximately 112 feet of travel of a vehicle such as the vehicle 18 from the time the left rear fender of the vehicle first enters the field of vision until the vehicle leaves the field of vision. If a vehicle is traveling too fast and responds by slowing down, the camera will record this action, in which case there would be no violation.

A modified film editor 84 is shown in FIG. 3, including the usual takeup spool 86 and supply spool 88 and additionally the usual viewing and/or splicing area 90. In addition, a replaceable linear scale 98 which slides on top of the viewer is disposed above a horizontal reach 94 of the film as it travels from the supply spool 86 to the takeup spool 88. This scale can be made up for different fields of view to suit various conditions. The scale cooperates with a pointer 96.

The film is viewed in the viewing area 90 and at a point where the left rear fender of the vehicle first enters the field of view of the camera the pointer 96 is clipped to the film at the zero mark on the left side of the scale. The film is then run through from the supply spool 88 to the takeup spool 86 until such time as the vehicle just leaves the field of view of the camera, at which time the film is stopped. The pointer then indicates the speed of the vehicle in M.P.H. on the scale. The Selective Enforcement Module 56 which can be set up in approximately 20 minutes functions as follows:

1. Automatically and inconspicuously counts the total number of vehicles exceeding any predetermined speed limit in one direction. Can also be made to count vehicles too slow or too close.

2. Automatically and inconspicuously counts total traffic in one direction. This equipment can, therefore, be used in place of an officer stationed at locations with a radar gun for selective enforcement survey. Drivers do not slow down for this equipment as they would for a radar car.

The Selective Enforcement Module 56 has the capability of automatically operating the speed conditioning module and the enforcement module. These units can be procured at a later date and merely plugged in to this unit. The Speed Conditioning Module is a lighted display board, which can quickly be set up at roadside and plugged in to the Selective Enforcement Module. The "2 FAST" light lights when a vehicle exceeds legal speed limit by 15%. The "GOOD" light lights when a vehicle is within plus or minus 15% of the legal speed limit. The "2 SLOW" light lights when a vehicle travels at less than 85% of legal speed limit. The foregoing percentages are adjustable. This is an educational device which conditions the motorist to drive within posted legal speed limits by psychological means of both positive and negative reinforcement. This is an excellent money-saving, public relations device when set up quickly in a neighborhood where there are complaints about speeding cars. It is highly visible evidence, to the tax paying citizen, that their Police and Traffic Engineering Departments are responding in a unique and highly efficient manner to a problem area. If a selective enforcement survey indicates need for enforcement, and a radar equipped squad car and officer are not available, the Enforcement Module can be quickly set up and plugged in to the Selective Enforcement Module 56. It functions as follows:

It is activated by the Selective Enforcement Module to take moving pictures of approximate three seconds duration of any vehicle traveling faster than the predetermined speed limit. The special movie camera records license plate number and serves as a recording timer of the vehicle's passage across the field of view. The speed of the vehicle can be quickly and accurately determined by the special viewer. The Traffic Speed Monitor System is an adaptable, versatile, law enforcement and traffic engineering tool which relieves the necessity of assigning a disproportionate share of valuable personnel and equipment to problem areas.

Accordingly, I have provided a low-cost system which is readily transportable and which, through reflex action on the part of the drivers, practically automatically insures travel of the vehicles at the proper rate of speed. In the event that a vehicle exceeds the legal speed, a motion picture of the travel of the vehicle is automatically made, providing a permanent record of the traffic violation with a very simple readout mechanism to establish the speed. The specific embodiment of the invention as herein shown and described is for illustrative purposes only, and various changes will be understood as forming a part of the present invention insofar as they fall within the spirit and scope of the appended claims.

The invention is claimed as follows:

1. A traffic speed monitor system comprising display means for disposition adjacent a roadway, said display means including three alternately operable elements, namely a first element to provide indication of proper speed, a second element to provide indication of too fast a speed, and a third element to provide indication of too slow a speed, means for sensing the movement of vehicles along said roadway, said system further comprising means including electronic means interconnecting said sensing means and said display means elements to operate a respective one of said display means elements indications, motion picture camera means for disposition adjacent said roadway in position to film said display means and a vehicle sensed by said sensing means, means interconnecting said motion picture camera means and said sensing means to start said motion picture camera means in operation when a vehicle moving too fast is sensed to provide a motion picture photographic record of said vehicle, means for terminating operation of said motion picture camera means a predetermined time after the start of operation thereof, said motion picture camera means including motion picture film operated at a predetermined speed, and further including a readout device comprising means for measuring the number of film frames in which a vehicle is displayed.

2. A traffic speed monitor system as set forth in claim 1 wherein the means for measuring the number of film frames comprises means for directly reading out speed in terms of distance and time.

* * * * *